(12) United States Patent
Weiss

(10) Patent No.: US 8,939,694 B2
(45) Date of Patent: Jan. 27, 2015

(54) FORM LOCKING CONNECTION WITH COMPENSATION OF POSITION ERRORS

(71) Applicant: Wolfgang Weiss, Ottobrunn (DE)

(72) Inventor: Wolfgang Weiss, Ottobrunn (DE)

( * ) Notice: Subject to any disclaimer, the term of this patent is extended or adjusted under 35 U.S.C. 154(b) by 0 days.

(21) Appl. No.: 13/851,552

(22) Filed: Mar. 27, 2013

(65) Prior Publication Data

US 2013/0287519 A1 Oct. 31, 2013

Related U.S. Application Data

(63) Continuation-in-part of application No. PCT/EP2011/005024, filed on Apr. 12, 2012.

(51) Int. Cl.
*F16B 37/02* (2006.01)

(52) U.S. Cl.
USPC .......................................... 411/537; 411/147

(58) Field of Classification Search
USPC .............. 411/147, 155, 156, 371.2, 537, 538; 606/288
IPC ....................................................... F16B 39/24
See application file for complete search history.

(56) References Cited

U.S. PATENT DOCUMENTS

| | | | |
|---|---|---|---|
| 1,901,078 A | | 3/1933 | Bourdon |
| 2,874,749 A | * | 2/1959 | Brink ........................... 152/427 |
| 3,154,348 A | | 10/1964 | Hibbard |
| 3,382,630 A | * | 5/1968 | Chivers ........................... 52/208 |

(Continued)

FOREIGN PATENT DOCUMENTS

| | | |
|---|---|---|
| DE | 2601388 A1 | 6/1977 |
| DE | 8412861 U1 | 8/1984 |

(Continued)

OTHER PUBLICATIONS

Why Loose Wheels Drive u, May 1, 2010.

*Primary Examiner* — Gary Estremsky
(74) *Attorney, Agent, or Firm* — Von Rohrscheidt Patents

(57) ABSTRACT

A form-locking connection with compensation of position errors including a first component and a second component to be connected to each other; characterized by a first circular form-locking element associated with the first component; a second circular form-locking element associated with the second component, and a compensating element provided between the first form-locking element and the second form-locking element, wherein the form-locking elements are fixed in the axial position thereof and together with the compensating element form an interlocking arrangement which positions the first component and the second component with respect to each other, wherein a side of the first form-locking element which faces the second from locking element is provided with a first surface which is curved in the manner of a spherical segment and the center point of curvature of which is positioned on the axis of the first form-locking element; wherein that side of the second form-locking element which faces the first form-locking element is provided with a second surface which is curved in the manner of a spherical segment and the center point of curvature of which is positioned on the axis of the second form-locking element, and wherein the compensating element, on the sides thereof remote from each other in the axial direction, has a third surface and a fourth surface respectively curved in the manner of spherical segments, the respective curvatures of which surfaces are matched to the facing first surface and second surface curved in the manner of spherical segments.

17 Claims, 12 Drawing Sheets

(56) References Cited

U.S. PATENT DOCUMENTS

| | | | |
|---|---|---|---|
| 4,860,513 A * | 8/1989 | Whitman | 52/410 |
| 5,057,111 A * | 10/1991 | Park | 606/288 |
| 5,211,448 A | 5/1993 | Hayashi | |
| 5,269,784 A * | 12/1993 | Mast | 606/288 |
| 5,542,777 A * | 8/1996 | Johnson | 403/389 |
| 5,545,230 A * | 8/1996 | Kinsinger et al. | 623/38 |
| 5,584,537 A | 12/1996 | Miansian | |
| 5,797,912 A * | 8/1998 | Runciman et al. | 606/286 |
| 7,691,131 B2 * | 4/2010 | Graf | 606/256 |

FOREIGN PATENT DOCUMENTS

| | | |
|---|---|---|
| DE | 9313244 U | 11/1993 |
| DE | 9313244 U1 | 11/1993 |
| EP | 0928249 B1 | 2/2002 |
| FR | 536941 A | 5/1922 |
| GB | 190512207 | 2/1906 |
| GB | 400887 A | 11/1933 |
| WO | WO9813220 A1 | 4/1998 |
| WO | WO9813220 A1 | 4/1998 |
| WO | WO02075170 A1 | 9/2002 |

* cited by examiner

FORM LOCKING CONNECTION WITH COMPENSATION OF POSITION ERRORS

RELATED APPLICATIONS

This application is a continuation of International Application PCT/EP2011/005024 filed on Oct. 7, 2011 claiming priority from German Application DE 10 2010 038 067.9 filed on Oct. 8, 2010, both of which are incorporated in their entirety by this reference.

FIELD OF THE INVENTION

The present invention relates to a form-locking connection with a compensation of position errors, in particular axis offset and/or axis angle deviation according to the preamble of patent claim 1. The invention furthermore relates to a screw, a nut and a compensation element of a form-locking connection of this type.

BACKGROUND OF THE INVENTION

Form-locking connections which connect two components with one another and which are configured to receive radial forces with respect to a connection axis without clearance have to include an exact tolerance-free coincidence of the axes of the respective form-locking elements in the components to be connected with one another. When more than one form-locking connection is provided for attaching the two components at one another, wherein each form-locking connection shall provide clearance-free reception of radial forces, a geometric over-determination is frequently generated since tolerances are always generated when producing the form-locking elements, wherein the tolerances can lead to alignment errors. Such geometric over-determinations are undesirable and therefore have to be avoided.

In the citation Symonds, Pat, "Why loose wheels drive us nuts", in RACE TECH INTERNATIONAL, vol. 17, issue 7 (May 2010), the problem of axis offset between wheel and wheel attachment is described for wheel connections.

An example for a form-locking connection of this type is illustrated in FIG. 1.

FIG. 1 illustrates a first and a second component 1, 2 to be connected with one another which are connected with one another through a bolt 9 with a centering cone 9' (first form-locking element), wherein the bolt is threaded into an attachment borehole 10 in the first component 1, wherein the centering cone 9 reaches through a borehole 20 with a centering cone 22' (second form-locking element). The bolt 9 which is for example configured as a centering bolt and which contacts with its centering cone 9' at the centering cone 22' of the borehole 20 provides that the two components 1, 2 are positioned relative to one another without clearance in axial direction of the bolt 9 and also in radial direction of the bolt 9. When both components 1, 2 shall be additionally connected with one another at another location through a form-locking device which is also capable of receiving forces that extend radially relative to the bolt axis, the entire connection between the two components 1, 2 is only defined geometrically when the axis $X_1$ of the attachment borehole 10 in the first component 1 and the axis $X_2$ of the borehole 20 in the second component 2 are identical. Due to real world production tolerances, this is typically not the case. In the embodiment of FIG. 1, the two axes $X_1$ and $X_2$ are offset from one another by the distance $\Delta x$.

It would be possible to perform the second connection between the first and the second component 1, 2 to be connected through a screw to be threaded into the borehole 10 of the first component 1 which is for example configured as a threaded borehole, wherein the screw head is supported at the outside of the second component 2 that is on the right in FIG. 1, however a threaded connection of this type would preload the first component 1 and the second component 2 only in axial direction of the screw but would not be able to receive any forces that act radially to the axis $X_1$. This type of connection facilitates a compensation of axis offset and minor axis angle deviation, however it is not suitable for receiving radial forces.

The first fixation of the two components 1, 2 relative to one another illustrated in an exemplary manner in FIG. 1 through the screw 9 can also be provided in another manner, for example through rivets.

An embodiment, wherein the two components are fixated relative to one another through an annular planar notch teething which is configured as a Hirth-teething is illustrated in FIGS. 8 and 9 and is described in the figure description. The centering of a wheel, for example of a vehicle wheel at a wheel carrier through a planar notch teething and its attachment at the wheel carrier through a central locking device is known from EP 0 928 249 B1. However, the threaded connection disclosed therein is not capable of receiving radial support forces through the nut.

BRIEF SUMMARY OF THE INVENTION

Therefore, it is an object of the present invention to provide a form-locking connection which is configured when fixating the two components to be connected in axial direction of the form-locking elements to receive the radial forces at more than one location without a geometric over-determination of the entire arrangement occurring.

This object is achieved through a form-locking connection for compensating position errors including a first component; a second component to be connected with the first component; a first circular form-locking element associated with the first component; a second circular form-locking element associated with the second component; and a compensation element provided between the first circular form-locking element and the second circular form-locking element, wherein the circular form-locking elements are fixated with respect to their axial positions and form a form-locking arrangement with the compensation element which form-locking arrangement positions the first component and the second component relative to one another, wherein the first circular form-locking element is provided with a first spherical segment shaped cambered surface on its side oriented towards the second circular form-locking element, wherein a center of curvature of the first spherical segment shaped cambered surface is arranged on an axis of the first circular form-locking element, wherein the second circular form-locking element is provided with a second spherical segment shaped cambered surface on its side oriented towards the first circular form-locking element, wherein a center of curvature of the second spherical segment shaped cambered surface is arranged on an axis of the second circular form-locking element, wherein the compensation element includes a third spherical segment shaped cambered surface whose curvature is adapted to the opposite first spherical segment shaped cambered surface and a fourth spherical segment shaped surface whose curvature is adapted to the opposite second spherical segment shaped cambered surface, wherein the compensation element includes a radial inside with an inner diameter which is provided with the radially inner third spherical segment shaped cambered surface, wherein the compensation element includes a radial outside which is provided with the radially outer fourth spherical segment shaped cambered surface, wherein the radially inner third spherical segment shaped cambered surface of the compensation element contacts the spherical segment shaped cambered surface of the first circular form-locking element in a spherical segment, wherein the radially outer fourth spherical segment shaped cambered surface of the compensation element contacts the spherical segment shaped cambered surface of the second circular form-locking element, wherein the radially inner third spherical segment shaped cambered surface and the radially outer fourth spherical segment shaped cambered surface of the compensation element are surfaces that are oriented away from one another in a radial direction, and wherein a curvature center of the radially inner third spherical segment shaped cambered surface and a curvature center of the radially outer fourth spherical segment shaped cambered surface are offset from one another in axial direction, and wherein the curvature center of the radially inner third spherical segment shaped cambered surface is closer to the compensation element than the curvature center of the radially outer fourth spherical segment shaped cambered surface.

For this purpose the form-locking connection is provided with a first and a second component to be connected with one another and as a particular feature of the invention includes a first circular form-locking element that is associated with the first component, a second circular form-locking element that is associated with the second component, and a compensating element provided between the first form-locking component and the second form-locking component. The form-locking elements are fixated with respect to their axial positions and form a form-locking arrangement together with the compensating element which positions the first component and the second component relative to one another. A side of the first form-locking component which faces the second form-locking component is provided with a first spherical segment shaped cambered surface whose center point of curvature is disposed on an axis of the first form-locking element. A side of the second form-locking component which faces the first form-locking component is provided with a second spherical segment shaped cambered surface whose center point of curvature is positioned on an axis of the second form-locking component, and wherein the compensating element on the sides thereof oriented away from each other in axial direction, includes a third spherical segment shaped cambered surface and a fourth spherical segment shaped cambered surface, whose curvatures are respectively adapted to the first spherical segment shaped cambered surface and the second spherical segment shaped cambered surface.

The configuration of the form-locking elements according to the invention and providing the compensation element configured according to the invention provides that position deviations between two form-locking elements can be compensated within a predetermined engineering configuration. These position deviations can thus include a parallel offset of the axes like the axis offset illustrated in FIG. 1 and also an angular deviation of the two axes relative to one another and can be compensated.

The form-locking connection according to the invention facilitates avoiding a geometric over determination between the two components to be connected with one another and their connection elements and to simultaneously provide an alignment of both components without clearance in a direction parallel to their contact plane at more than one location.

Preferably, the first and fourth spherical segment shaped surfaces are cambered convex and the second and the third spherical segment shaped surface are cambered concave.

In one embodiment of the invention, the first form-locking element can be provided in one opening of the first component and the second form-locking element can be provided in an opening of the second component. Thus, the form-locking is only provided by the compensation element which engages both openings, wherein plural form-locking connections configured according to the invention can be provided for connecting both components.

Preferably the compensation element is configured as a compensation ring.

In another embodiment of the invention, the first form-locking element is provided at a bolt device, wherein the bolt device is connected with the first component and fixated with respect to its axial position and extends through a borehole of the second component and the second form-locking element is provided at the borehole of the second component, wherein the second component is clamped between the bolt device and the first component. The bolt device includes at least one radial section at its end oriented away from the first component at a side oriented towards the second component along its circumference. The radial section is provided with a first spherical segment shaped surface on the side oriented towards the second component, wherein the curvature center of the surface is arranged on the axis of the bolt device. The second component is provided with a second spherical segment shaped cambered surface along the circumference of the borehole on the side oriented towards the radial section of the bolt device, wherein the curvature center of the surface is arranged on the axis of the borehole and the compensation element configured as compensation ring is provided between the second component and the radial section of the bolt device.

In a preferred embodiment of the form-locking connection according to the invention configured as bolt connection, the bolt device is formed by a screw, wherein the screw is threaded into a threaded borehole of the first component, and wherein the radial section is configured at a screw head of the screw.

As an alternative thereto, the bolt device can be formed by a screw, wherein the screw extends through a borehole of the first component and is threaded into a nut supported at the first component.

It is also possible that the bolt device is formed by a threaded bolt connected with the first component and a nut threaded onto the threaded bolt, is wherein the radial section is then provided at the nut.

When the bolt device is configured as a screw or as a nut, the compensation ring can be configured secured against loss, but movable on the screw or at the nut.

A preferred application of the form-locking connection according to the invention is attaching a wheel at a wheel receiver, in particular when this attachment is configured through a central locking device for the wheel. Thus, the first component is formed by the wheel receiver and the second component is formed by the wheel. This application for attaching a wheel at a wheel receiver is not only implementable as a central locking device, but also when the wheel is attachable through a plurality of centering bolt devices, like for example centering wheel screws or wheel nuts at the wheel receiver. When the respectively self-centering bolt devices are configured as form-locking connections according to the invention, a geometrical over-determination of the wheel attachment is reliably prevented.

An embodiment in a central locking device of a wheel is advantageous in which for example the wheel receiver includes a central threaded wheel attachment bolt and in which the radial section is for example provided at the nut that is threaded onto the wheel attachment bolt.

Preferably the wheel receiver is provided with a first annular profile, preferably a planar notch teething like for example a Hirth-teething and the wheel is provided with a second annular profile, preferably a planar notch teething like for example a Hirth-teething, wherein the first and the second annular profile or teething engage one another and center the wheel with respect to the wheel receiver. In this embodiment of a connection between the wheel receiver and the wheel, providing a conventional bolted connection as a central locking device in which a wheel screw or wheel nut contacts the surface of the wheel that is oriented away from the wheel receiver, can have the effect that the bolted connection only transfers axial forces in a direction of the axis of the bolted connection. Radial support forces between the wheel and the bolted connection are thus not supported. Experiments by the inventor have yielded that a wheel attached at a wheel receiver is subjected to dynamic forces which can cause an oscillating movement to be induced at the support location of the bolted connection at the wheel which subjects the bolted connection to a disengagement torque; this means it loads the threaded connection with an unthreading torque which can lead to a disengagement of the bolted connection. In order to be able to support the radial forces of the disengagement torque, it can be useful to provide a connection without clearance between the wheel and the wheel receiver, also in the portion of the bolted connection of the wheel. A connection of this type due to unavoidable production tolerances, however, would lead to a geometrical over-determination of the attachment of the wheel at the wheel receiver.

The invention improves upon this and provides a bolt connection for the central locking device of the wheel which avoids a geometric over-determination but is capable of supporting radial forces from the wheel also through the wheel attachment bolt at the wheel carrier, wherein the forces occur in static and dynamic operations.

A preferred embodiment of a screw for a form-locking connection according to the invention provided as a bolted connection is characterized in that the screw head at its side oriented towards the threaded section of the screw is provided with a circular segment shaped convex cambered surface, wherein the curvature center of the surface is provided on the axis of the screw. Preferably the compensation ring is arranged on the screw movable, but so that it is secured against loss.

A preferred embodiment of a nut for a form-locking device according to the invention configured as a bolt connection is characterized in that the nut is provided at least on one axial face side with a spherical segment shaped convex cambered surface, wherein the center of curvature of the surface is arranged on the axis of the nut.

An embodiment of a compensation element, in particular a compensation disc or a compensation ring is preferred for a bolt connection according to the invention, wherein the compensation element at both axial faces is provided with one respective spherical segment shaped cambered surface whose respective curvature center is arranged on the axis of the compensation element. When both centers of curvature coincide, only angle compensation is possible, whereas, when both centers of curvature are offset from one another in axial direction, also an axis parallel offset of the two axes can be compensated. Preferably one of the two spherical segment shaped cambered surfaces of the compensation ring is concave, whereas the other of the two spherical segment shaped cambered surfaces of the compensation ring is convex.

BRIEF DESCRIPTION OF THE DRAWINGS

The invention is subsequently described in more detail based on a embodiment with reference to drawing figures, wherein.

DETAILED DESCRIPTION OF THE INVENTION

Figure 1:
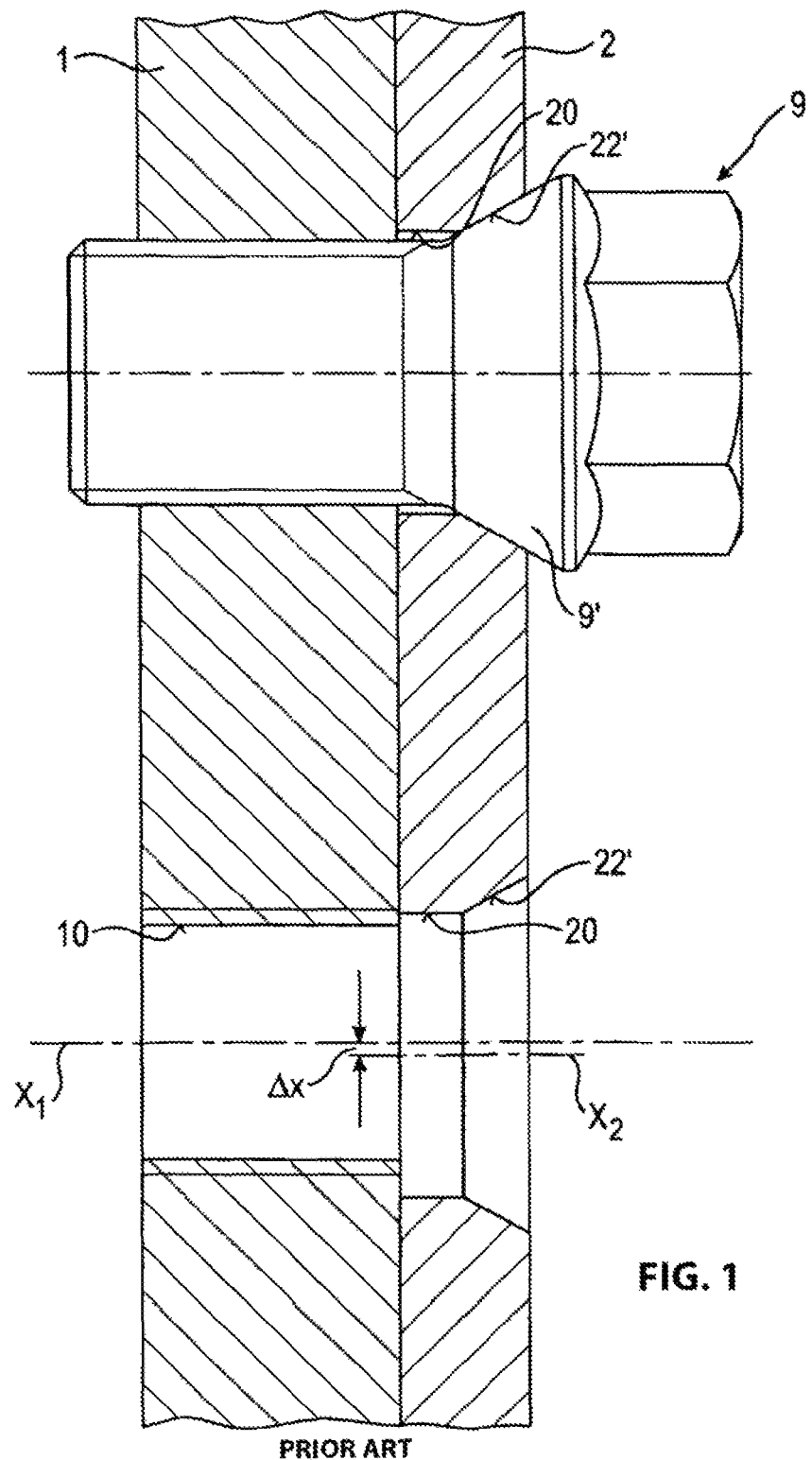
FIG. 1 illustrates a partial sectional view in principle of two components connected with one another without clearance.

In FIG. 1, briefly described supra, a pair of boreholes 10, 20 is illustrated in a lower portion, wherein the borehole 20 is provided with a conical annular centering surface 22' in its outlet portion oriented away from the first component 1, in this pair of boreholes 10, 20, the two bore axes $X_1$ and $X_2$ are offset from one another by an axis offset $\Delta x$, representing an axis misalignment.

The connection of the two components 1, 2 through a form-locking connection configured as a bolt connection through the borehole pair 10, 20, is subsequently described with reference to FIGS. 2 through 6.

Figure 2:
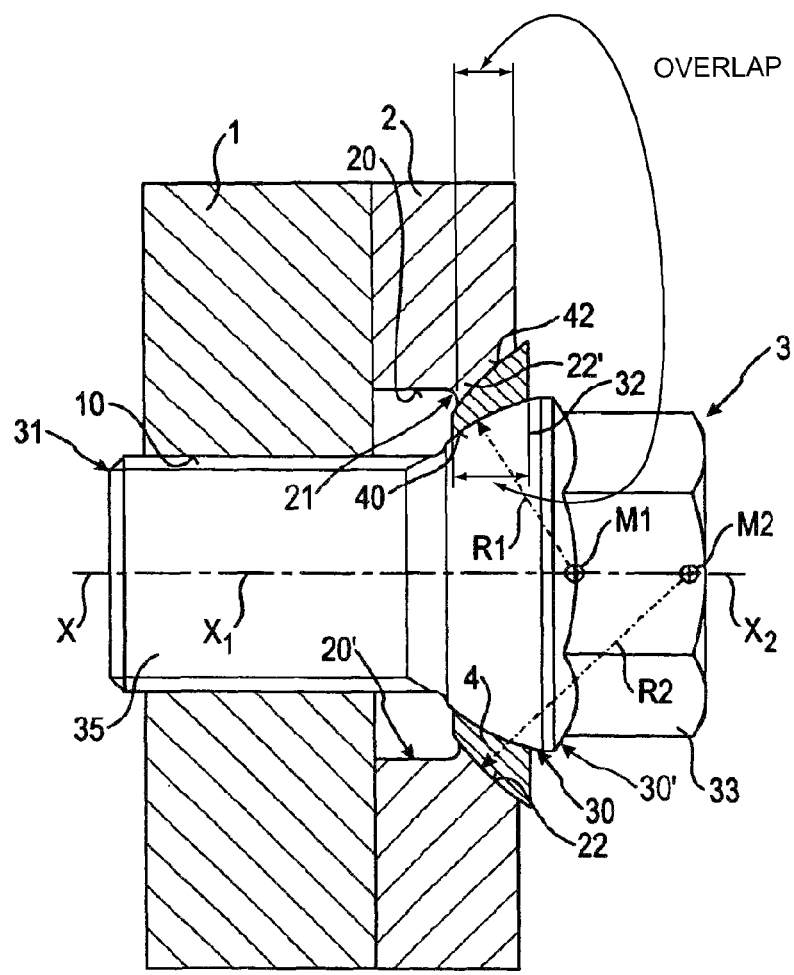
FIG. 2 illustrates a partial sectional view of a first embodiment of the form-locking connection according to the invention, configured as a bolt connection.

FIG. 2 illustrates a connection of the two components 1, 2 through a bolt device 3, configured as a screw 31 in a condition in which there is no position misalignment (for example axle offset and/or axle angle deviation), thus the axes $X_1$ and $X_2$ are identical and coincide with the axis X of the bolt device 3. The bolt connection is not limited to a screw connection; it can also be configured differently, for example as a bayonet connection or as a rivet connection.

In the illustrated embodiment of this bolt connection, the borehole 10 is configured as a threaded borehole into which the screw 31 is threaded. The screw 31 is provided with a screw head 33 which includes a section 30 at its side oriented towards the thread section 35 threaded into the threaded borehole 10, wherein the section 30 radially protrudes with respect to the threaded section 35. This radial section 30 forms a first form-locking element and is thus provided for this purpose with an annular spherical segment shaped convex cambered surface 32.

The center point M1 of the curvature radius R1 of the first spherical segment shaped cambered surface 32 is disposed on the axis X of the bolt device 3 configured as a screw 31. Since there is no axis misalignment in the embodiment of FIG. 2, the axis $X_1$ of the threaded borehole 10 which corresponds to the axis X of the screw 31 and the axis $X_2$ of the borehole 20 are in alignment with one another.

The annular centering surface in the outlet portion of the borehole 20 of the second component 2 is configured as a second circular form-locking element 21 and is thus provided with a concave cambered spherical segment shaped surface 22. The center point M2 of the curvature radius R2 of the circular segment shaped cambered surface 22 is therefore arranged on the axis $X_2$ of the borehole 20. The center points M1 and M2 in the embodiment of FIG. 2 are therefore on a line, but are offset from one another in axial direction.

The transition between the borehole 20 and the second component 2 and the circular segment shaped surface 22 is configured so that the diameter of the borehole 20 in the portion of the transition of a cylindrical portion 20' oriented to the first component 1 of the borehole 20 initially becomes smaller and then expands along the spherical segment shaped cambered surface 22. This way, an undercut of the radial innermost end of the spherical segment shaped cambered surface 22' is configured which provides a particularly advantageous pressure distribution on the spherical segment shaped cambered surface 22.

Figure 7:
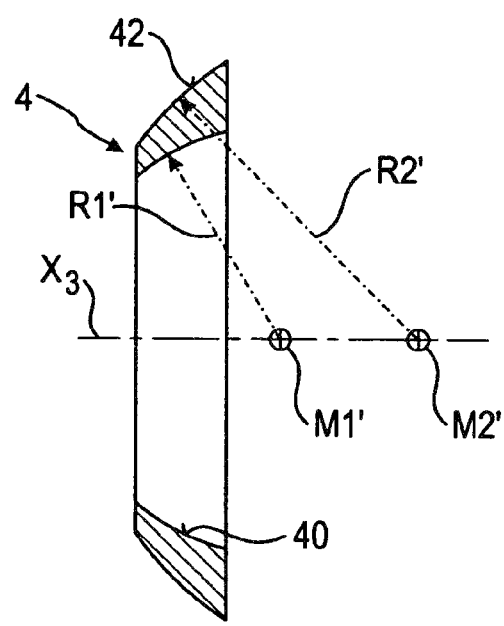
FIG. 7 illustrates a compensation ring of the form-locking connection in a longitudinal, sectional view through an axis plane.

A compensation ring 4 is inserted between the convex cambered surface 32 of the screw 31 and the concave cambered surface 22 in the outlet portion of the borehole 20 of the component 2. Thus, the compensation ring 4 as illustrated in FIG. 7 is provided at its inner diameter with a spherical segment shaped concave cambered annular surface 40 whose camber is adapted to the camber of the convex cambered surface 32 of the screw 31. Thus, the concave surface 40 of the compensation ring 4 can contact the convex surface 32 of the screw 31 with a precise fit.

At its radial outside, the compensation ring 4 is provided with a spherical segment shaped convex cambered surface 42, whose camber is adapted to the camber of the concave surface 22 in the outlet portion of the borehole 20 of the component 2. The convex surface 42 of the compensation ring 4 can thus contact the concave surface 22 of component 2 with a precise fit.

As illustrated in the longitudinal sectional view of the compensation ring 4 in FIG. 7, the center point M1' of the curvature of the cambered surface 40 and the center point M2' of the cambered surface 42 are both arranged on the axis $X_3$ of the compensation ring 4, and thus on the same side of the compensation ring 4.

Since the convex cambered surface 32 of the screw 31 and the concave inner surface 40 of the compensation ring 4 are respectively configured spherical segment shaped, the compensation ring 4 can pivot, wherein the respective cambered surfaces remain in contact with one another. The slanted positioning of the compensation ring 4 caused by this pivoting provides that the compensation ring remains in contact with the surface 22 of the component 2 and also with the surface 32 of the screw 31 when there is an axis offset.

The identical camber radii R1 and R1' of the spherical segment shaped cambered surfaces 32 and 40 are smaller than the also identical camber radii R2 and R2' of the spherical segment shaped cambered surfaces 22 and 42.

The operating mode of the position error compensation of the embodiment illustrated in FIG. 2 of the bolt connection according to the invention is subsequently illustrated with respect to FIG. 3.

Figure 3:
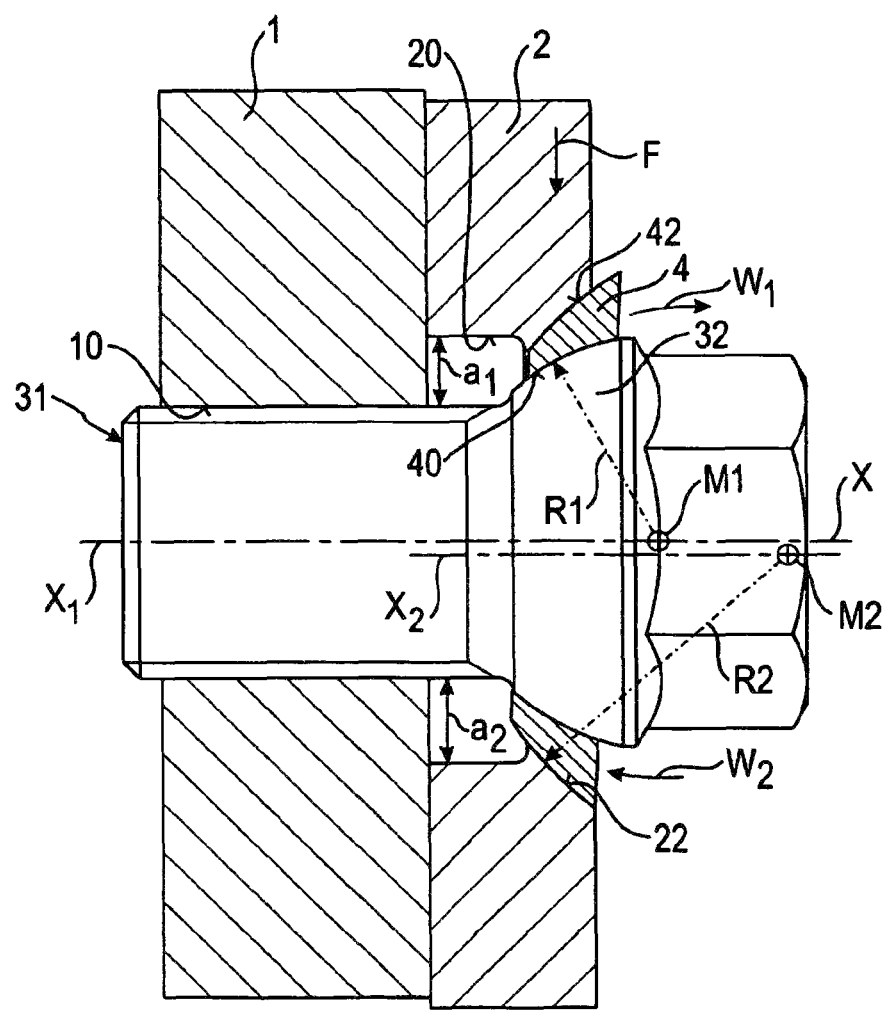
FIG. 3 illustrates a partial sectional view of a bolt connection according to FIG. 2, compensating an axle offset.

It is evident from FIG. 3 that the axis $X_2$ of the borehole 20 of the component 2 is offset downward in parallel with respect to the axis $X_1$ of the threaded borehole 10 in the component 1 which corresponds to the axis X of the screw 31. Based on this axial offset, the radial distance $a_1$ between the outer circumference of the screw 31 and the inner circumference of the borehole 20 of the component 2 at the top side of the screw 31 is smaller in the illustration of FIG. 3 than the respective radial distance $a_2$ below the screw. Thus, the compensation ring 4 is pivoted clockwise when threading the screw 31 into the threaded borehole 10 in the sectional view of FIG. 3 as indicated in a symbolic manner by the arrows $W_1$ and $W_2$. During this pivot movement, the cambered surfaces 40, 42 of the compensation ring 4 always remain in surface contact with the respectively associated surface 32 of the screw 31 or the surface 22 of the second component 2.

A force F impacting the screw 3$i$ in its radial direction from the second component 2 can thus be introduced through the compensation ring 4 into the screw 31 and thus into the first component 1.

Figure 4:
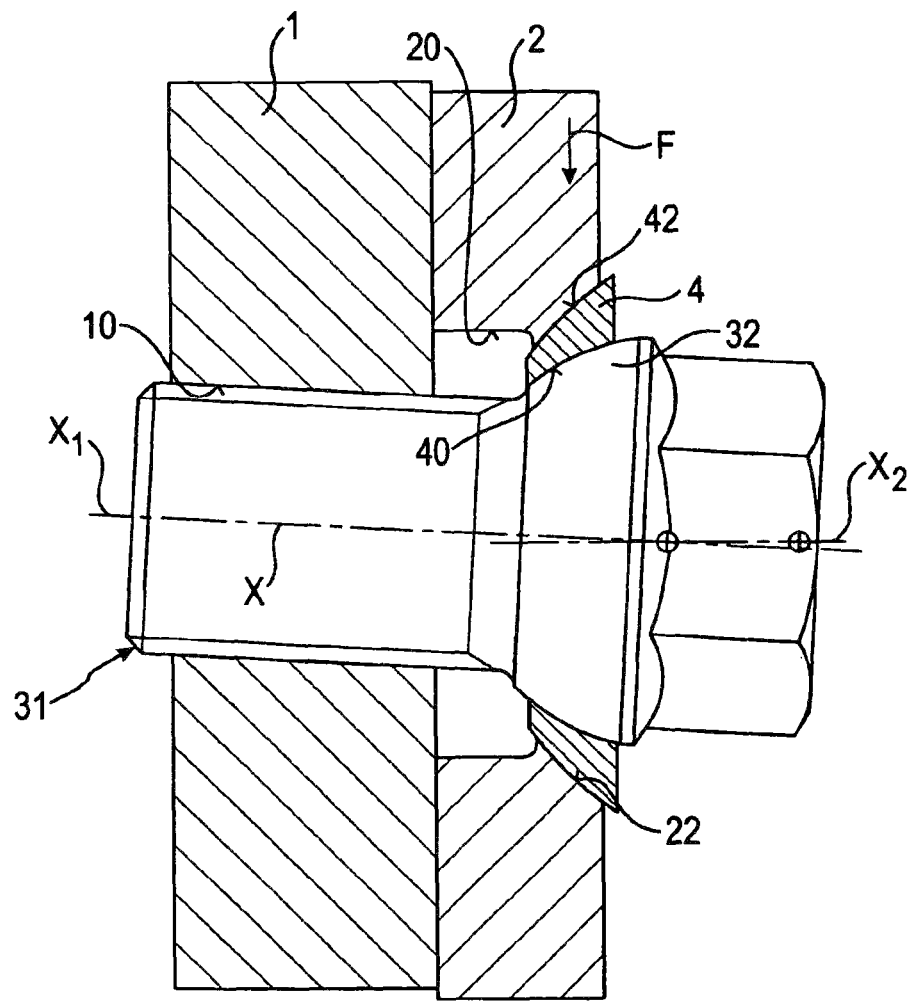
FIG. 4 illustrates the partial sectional view of the bolt connection according to FIG. 2, compensating an axle angle deviation.

FIG. 4 illustrates the form-locking connection according to FIG. 2, wherein, however, (illustrated in an exaggerated manner) an axis angle deviation of the axis $X_1$ of the threaded borehole 10 in the component 1 which coincides with the axis X of the screw 31 is compensated with respect to the axis $X_2$ of the borehole 20 in the component 2. It is evident from FIG. 4 that the cambered surface 32 of the screw 31 contacts the cambered surface 40 of the compensation ring 4 in spite of the slanted arrangement of the bolt 31 caused by the axis angle deviation, so that the screw 31 in the portion of its cambered surface 32 along its circumference contacts the compensation ring through surface contact, wherein the compensation ring in turn with its convex cambered radial outer surface 42 contacts the concave cambered surface 22 of the borehole 20 through surface contact, so that the screw 31 along its entire circumference is in indirect contact with the second component 2 through the compensation ring 4.

Also for this axis angle deviation, a force F impacting the screw 31 in its radial direction from the second component 2 can be introduced through the compensation ring 4 into the screw 31 and thus into the first component 1.

Figure 5:
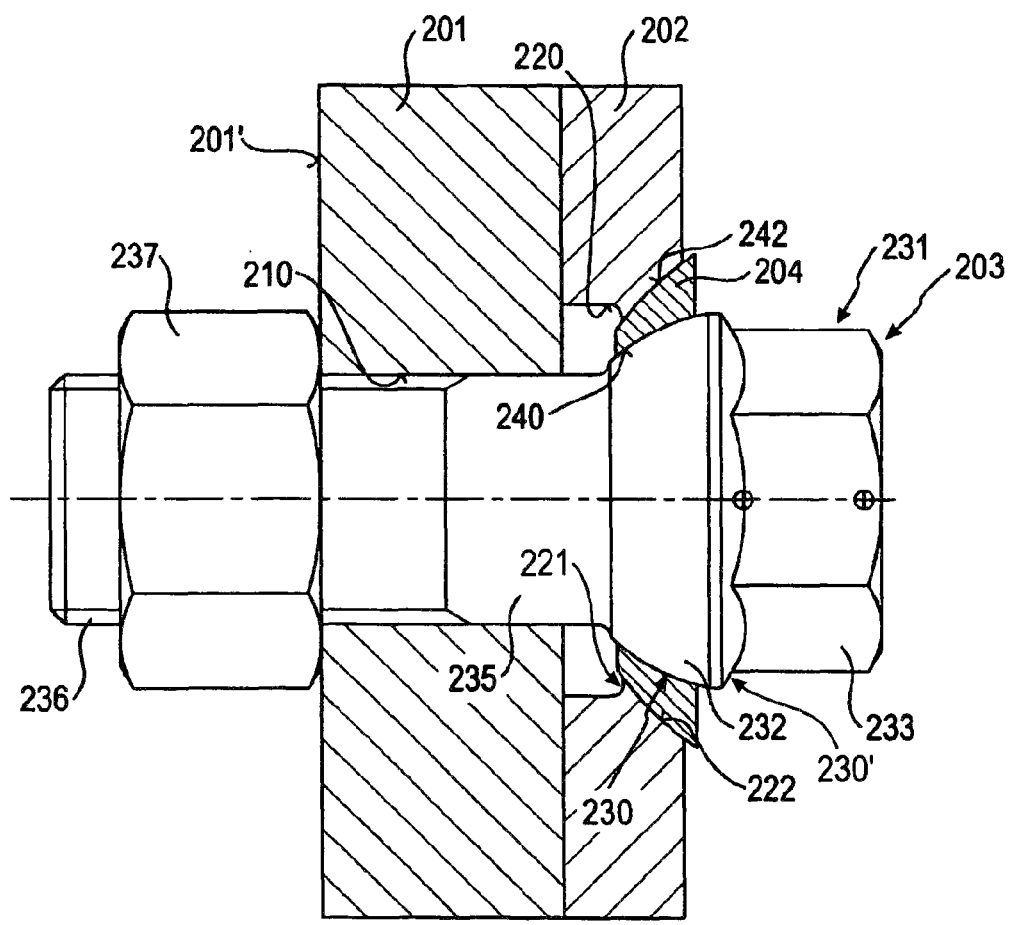
FIG. 5 illustrates a partial sectional view of a form-locking connection according to the invention, configured as a bolt connection.
Figure 6:
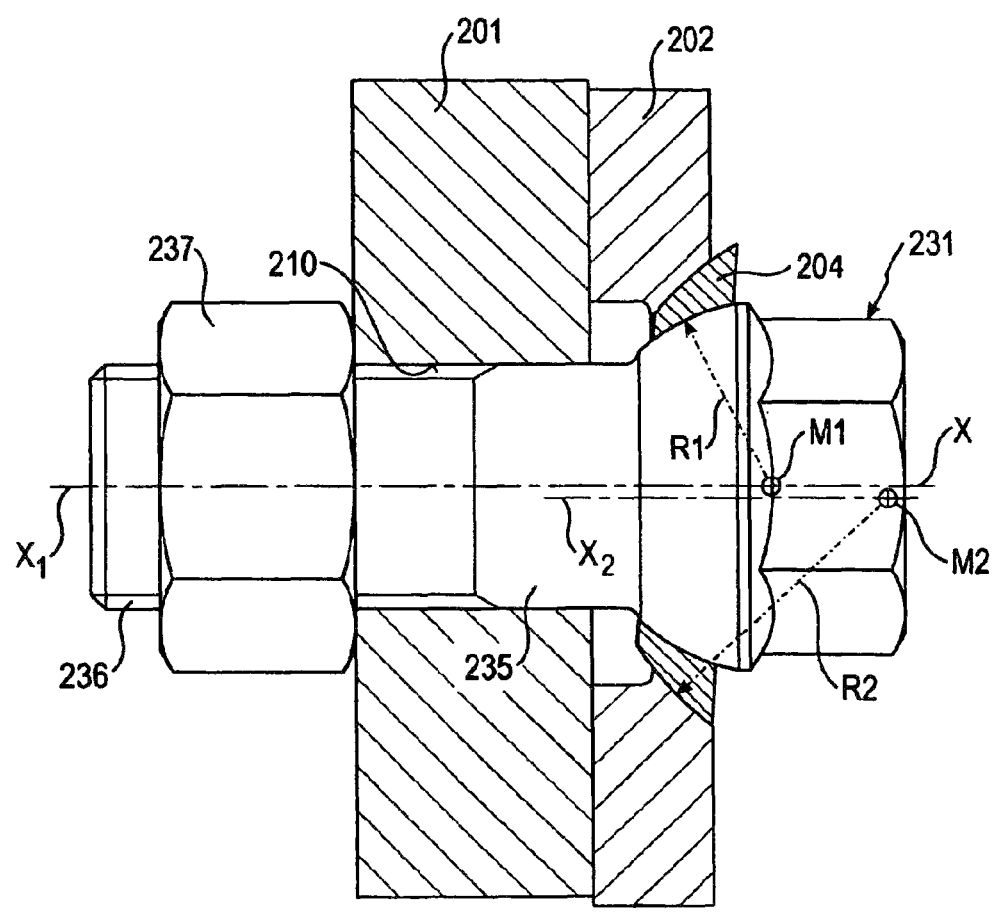
FIG. 6 illustrates a partial sectional view of the second embodiment according to FIG. 5, compensating an axle offset.

FIGS. 5 and 6 a second embodiment of the present invention is illustrated which corresponds essentially to the first embodiment as illustrated in FIGS. 2 through 4. The screw 231 forming the bolt device 203, however, is provided with a cylindrical shaft section 235 which is only provided with an external thread 236 in the portion of its free end. The cylindrical shaft section 235 is thus inserted through the borehole 220 in the second component 202 into the borehole 210 in the first component 201 which is configured as a cylindrical borehole without interior thread. A nut 237 is threaded onto the free end of the screw 231 provided with the exterior thread 236, wherein the nut contacts the outer surface 201' of the first component 201 which outer surface is oriented away from the second component 202. Thus, the components 201 and 202 are clamped through the compensation ring 204 which is supported with its concave surface 242 on the concave surface 222 formed in the edge portion of the borehole 220 which forms the second form-locking element 221 and wherein the concave surface 240 of the compensation ring 204 contacts the convex annular surface 232 at the radial section 230 of the screw head 233 forming the first form-locking element 230'.

Thus, the screw 231 with respect to its configuration corresponds to the screw 31 of the first embodiment as illustrated in FIGS. 2 and 3.

In the second embodiment, the compensation of axis offset and/or axis angle deviation as illustrated in FIG. 6 is provided in the same manner as illustrated in combination with the first embodiment in FIG. 3 and in FIG. 4.

Figure 8:
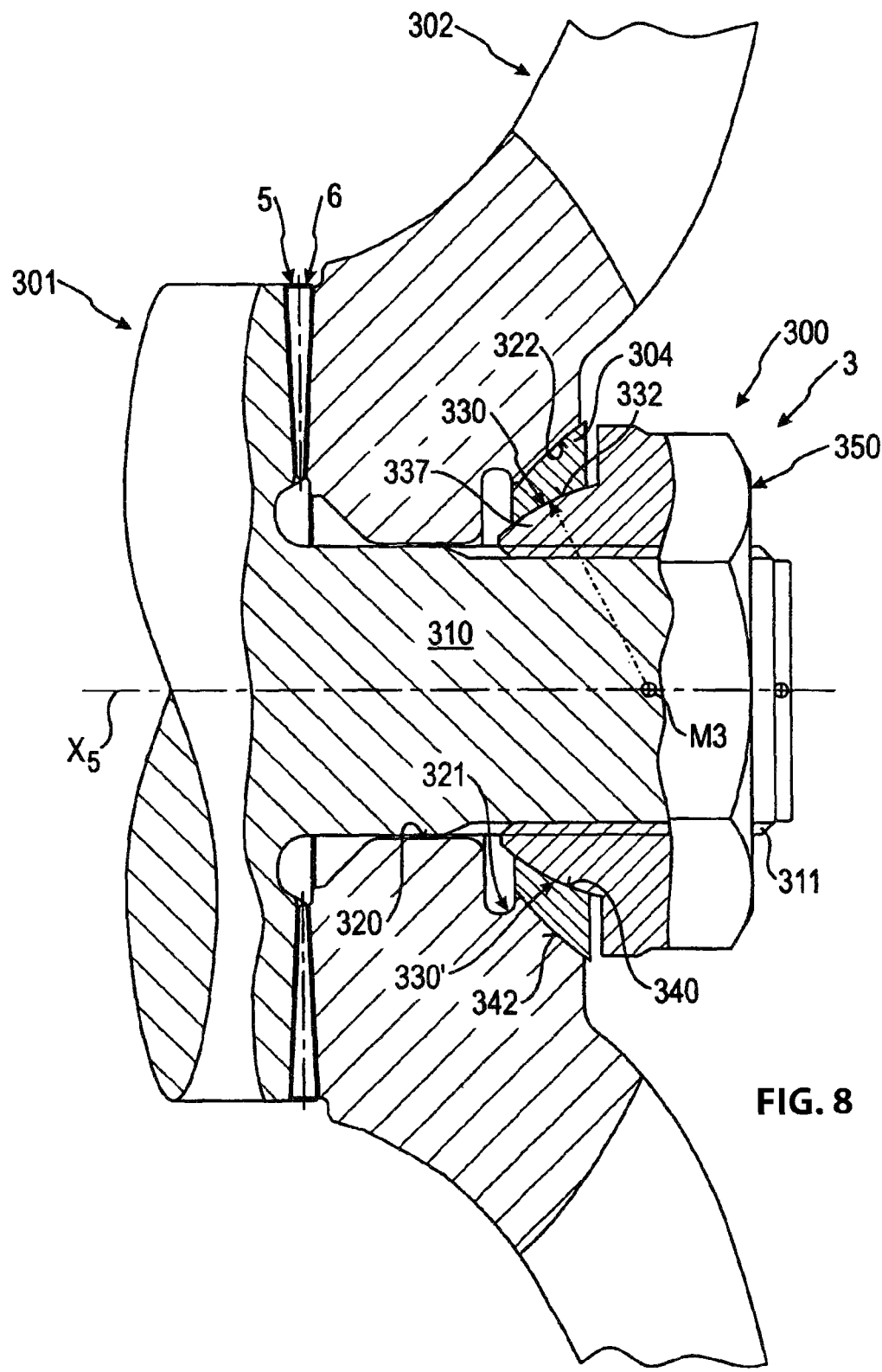
FIG. 8 illustrates a partial sectional view of a third embodiment of the form-locking connection according to the invention, used as a central locking device for a wheel.
Figure 9:
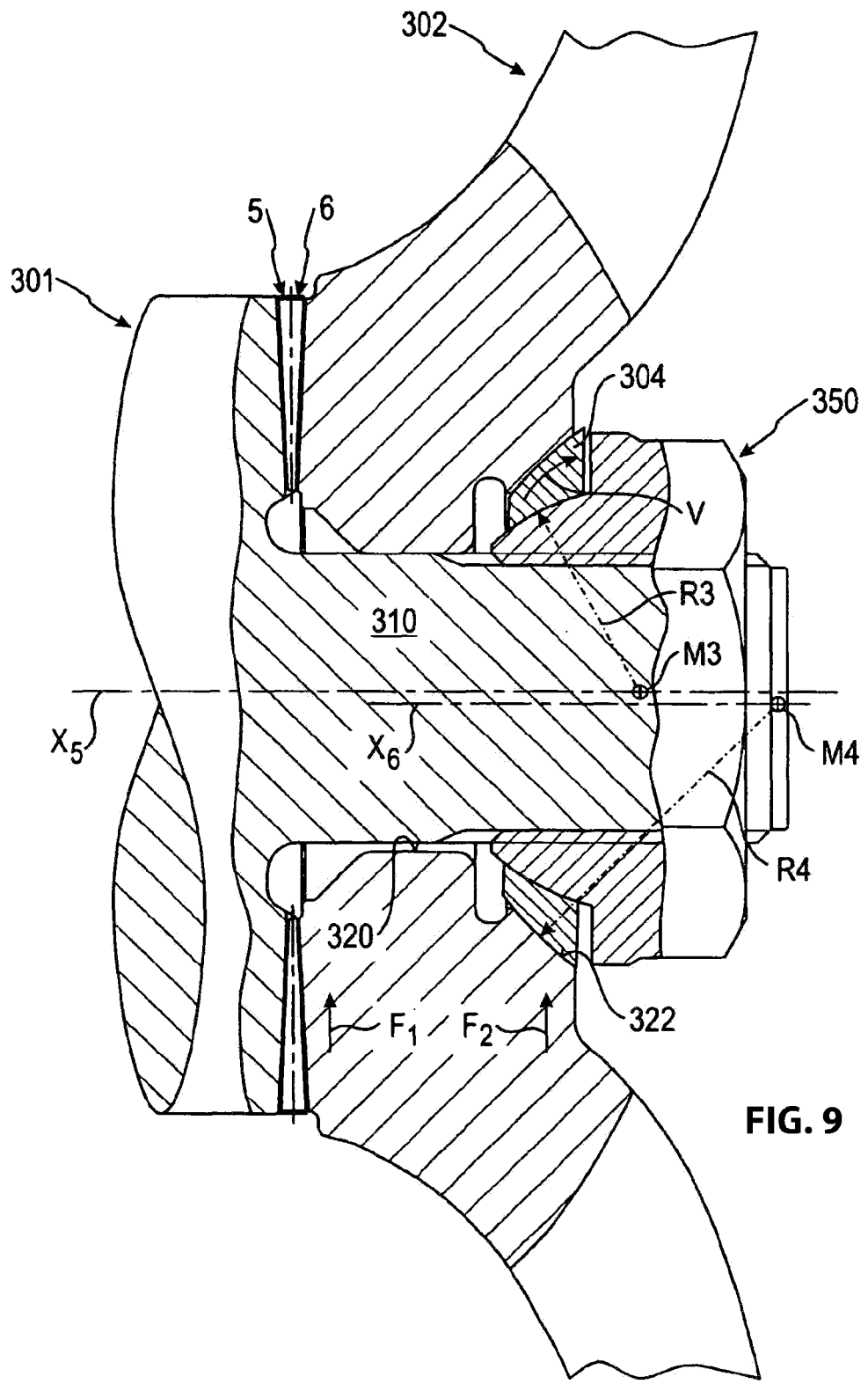
FIG. 9 illustrates the partial sectional view of a third embodiment according to FIG. 8, compensating an axle offset.

A third variant of the bolt connection according to the invention with position error compensation is illustrated in FIGS. 8 and 9 with reference to an embodiment of a central locking device for a wheel, for example a vehicle wheel.

FIG. 8 illustrates the wheel 302 in a partial sectional view which wheel is attached at a wheel receiver 301 through a central locking device 300, forming the bolt device 3 and described infra.

The wheel receiver 301 is rotatably supported through suitable roller bearings at a non-illustrated wheel carrier in a conventional manner. A central wheel attachment bolt 310 extends centrally and coaxially to the axis $X_5$ of the wheel receiver 301. In the portion of its free end, the wheel attachment bolt 310 is provided with an outer thread 311 for receiving a threadable nut 350 including the radial section 330 forming the first form-locking element 330'. The second form-locking element 321 is configured at the wheel 302 about the outlet of the pass-through borehole 320 receiving the center wheel attachment bolt 310 and provided with the annular and spherical segment shaped concave cambered surface 322. Between the nut 350 and the wheel 302, a compensation ring 304 is arranged in the embodiment of FIGS. 2 through 4.

The configuration of the compensation ring 304 corresponds to the embodiment of the compensation ring 4 illustrated in FIGS. 2 through 4 and 7. Accordingly the wheel 302 corresponds to the component 2 of the first embodiment illustrated in FIGS. 2 through 4. Also the function of the compensation ring 304 with its convex circular segment shaped surface 342 and concave circular segment shaped surface 340, which are provided with respective opposite surfaces 322, 332 at the wheel 302 or at an annular shoulder 337 of the nut 350 oriented towards the wheel 302, corresponds to the functionality described with reference to FIGS. 2 through 4 as illustrated in FIG. 9. The center point M3 of the camber radius R3 of the circular segment shaped cambered surface 332 is thus arranged on the axis of the nut 350 which essentially coincides in threaded-on condition with the axis $X_5$ of the wheel attachment bolt 310.

The wheel receiver 301 is radially expanded on its side oriented towards the wheel 302 and forms an annular face which extends in an orthogonal manner relative to the axis $X_5$ of the wheel receiver 301. The wheel attachment bolt 310 which is not necessarily, but in the illustrated embodiment integrally configured with the wheel receiver 301 axially protrudes from this face. On this annular face, enveloping the wheel attachment bolt 310, a profile 5 is configured at the side oriented towards the wheel 302, wherein the profile 5, for example forms an annular, circular teething of a planar notch teething, wherein the annular teething is arranged in a central and orthogonal manner relative to the rotation axis $X_5$ of the wheel receiver 301. This planar notch teething can be configured for example as a Hirth-teething.

The wheel 302 also includes an annular profile 6 in the portion of the wheel hub on its side oriented towards the wheel receiver, wherein the profile is adapted to the profile 5 of the wheel receiver 301 and can thus also be configured as a planar notch teething, preferably as Hirth-teething. The two profiles 5, 6 are configured for engagement with one another. The configuration of the profiles 5, 6 is subsequently described with reference to FIG. 10.

Figure 10:
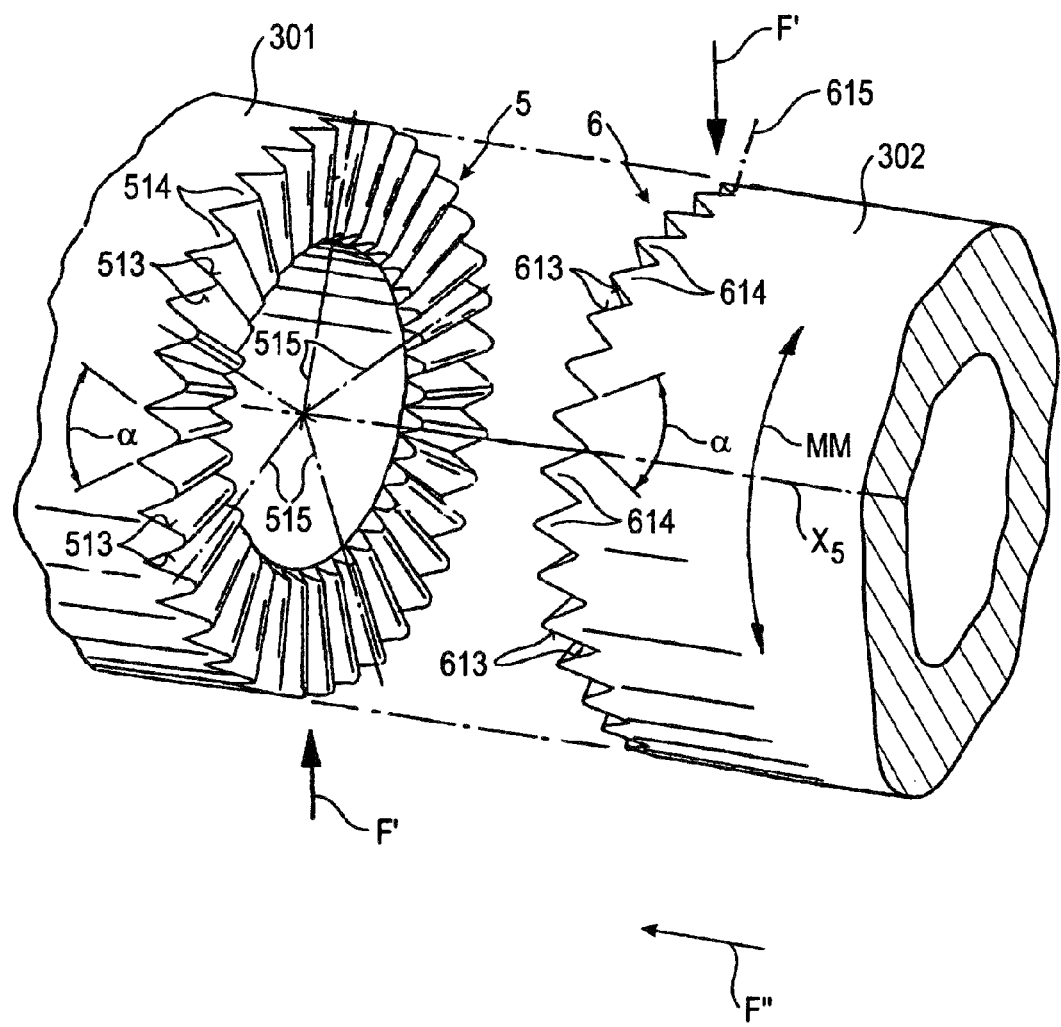
FIG. 10 illustrates a planar notch teething according to the embodiment illustrated in FIGS. 8 and 9.

In FIG. 10, for example two corresponding planar notch teethings are illustrated in perspective as profiles 5, 6, wherein one profile is associated with the wheel 302 and the other profile is associated with the wheel receiver 301. It is clearly apparent that the teething is formed by triangular profile sections 514, 614, whose longitudinal axes 515, 615 intersect in the center line or rotation axis $X_5$. The wedge angle α of the profile sections 514, 614 is thus constant with respect to the longitudinal axis 515, 615. Certainly also additional profile configurations are conceivable.

The wedge surfaces 513 of the profile 5 and the wedge surfaces 613 of the profile 6 are configured for mutual surface contact with one another. The profiles 5, 6 engage one another in assembled condition of the wheel 302 at the wheel receiver 301.

The preload force of the wheel 302 is thus introduced into the wheel receiver 301 through the engaging profiles 5, 6; this means received by the wedge surfaces 513, 613 of the profiles 5, 6 for example of the planar notch teething so that the wheel 302 is force positioned and fixated through the wedge shaped guide- and support surfaces into a position that is defined with respect to three coordinates in space and which is aligned with the wheel receiver 301 with respect to the rotation axis $X_5$.

Through the two profiles 5, 6 that are in engagement with one another, the wheel loads which are symbolically illustrated through arrows F' and also brake and drive moments which are symbolized through the double arrow MM are transmitted between the wheel receiver 301 and the wheel 302.

Though the wheel 302 is fixated in three directions in space with respect to the rotation axis $X_5$ of the wheel receiver 301 through the profiles 5,6 that are in engagement with one another, pivot torques which are caused for example through transversal forces F" impacting the contact surface of the wheel 302, wherein the transversal forces impact parallel to the rotation axis $X_5$ and at a lateral distance thereto, can cause the wedged surfaces 513, 613 to disengage the profiles 5, 6 from their mutual contact. The inventor has found in the prior art that this does not only lead to a wear of the surfaces in the portion of the profiles 5, 6, but that it can also lead to the wheel 302 disengaging from the nut 350 fixating it at the wheel receiver 301. In order to prevent this, the invention provides using a support of radial forces in the portion of the nut 350 of the central locking device 300 in addition to supporting the forces through the profiles 5, 6 engaging one another, without a geometric over determination of the attachment of the wheel 302 at the wheel receiver 301 occurring. This is also facilitated by the arrangement illustrated in FIGS. 8 and 9 including the compensation ring 304 and the wheel nut 350.

In the illustration of FIG. 9, there is an axis offset between the axis $X_5$ of the wheel attachment bolt 310 and the axis $X_6$ of the pass-through borehole 320 in the center of the wheel 302. The center point M4 of the curvature radius R4 of the concave cambered surface 322 of the wheel 302 is therefore on the wheel axis $X_6$.

Since the wheel 302 is already geometrically fixated through the engaging profiles 5, 6 with respect to the wheel receiver 301, the compensation ring 304 has to pivot clockwise as illustrated in the embodiment of FIG. 3 and as symbolized by the arrow V in order to cause form-locking between the wheel 302, the compensation ring 304 and the nut 350 when the nut 350 is threaded onto the wheel attachment bolt 310.

This attachment of a wheel 302 at a wheel receiver 301 facilitates introducing radial components of forces that impact the wheel 302 in static and in dynamic condition through the engaging profiles 5, 6 and also through the compensation ring 304 and the nut 350 into the wheel receiver 301 as indicated by the arrows $F_1$ and $F_2$. Thus, the connection of the two engaging profiles 5, 6 is unloaded from moments which can lead in a conventional central threaded attachment of the wheel 302 to a lift-off of the profile teeth described supra and to a wear and disengagement of the wheel attachment caused thereby.

Also an axis angle deviation in which the axis $X_5$ of the wheel attachment bolt 310 and the axis $X_6$ of the pass-through borehole 320 are at an angle relative to one another is compensated like in the embodiment of FIG. 4.

Figure 11:
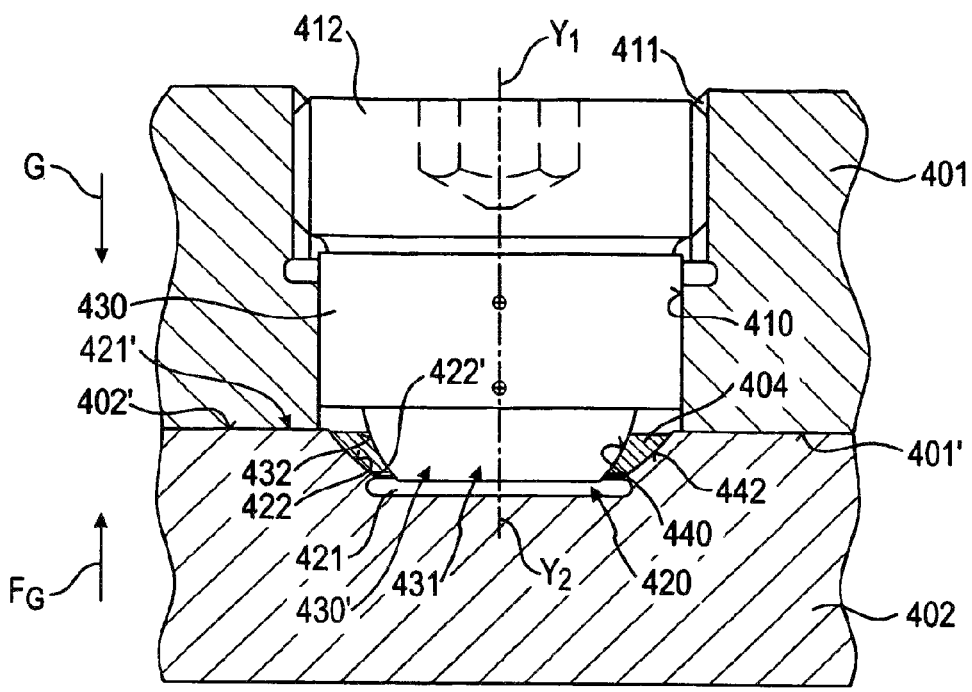
FIG. 11 illustrates a partial sectional view of a fourth variant of the form-locking connection according to the invention.
Figure 12:
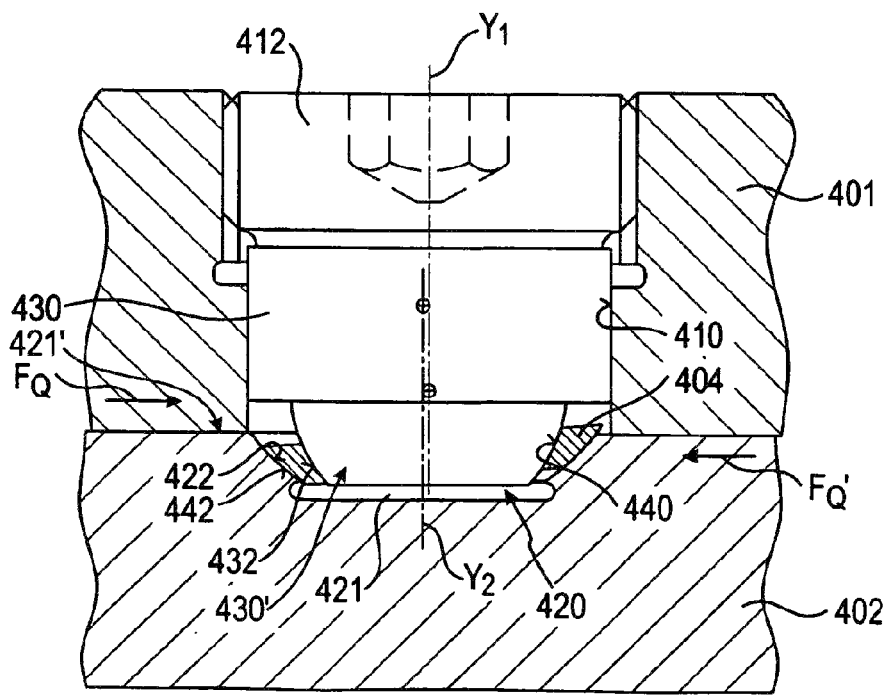
FIG. 12 illustrates a partial sectional view of a fourth embodiment according to FIG. 11, compensating an axle offset.
Figure 13:
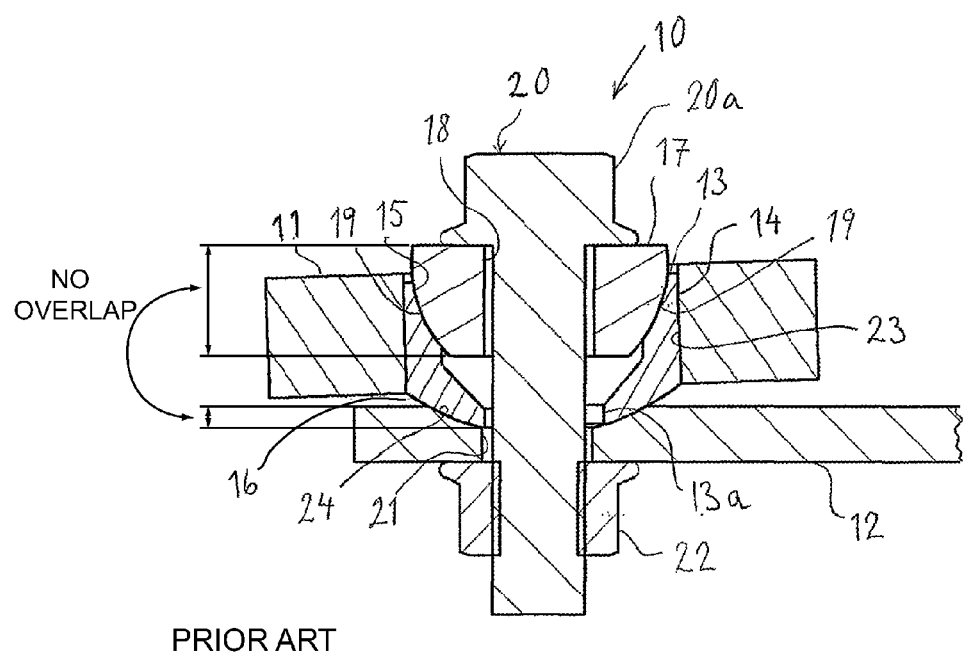
FIG. 13 illustrates a prior art form-locking connection.

Another application of a form-locking connection according to the invention for compensating positioning errors, (for example axis offset and/or axis angle deviation) is illustrated in FIGS. 11 and 12.

The two components 401 and 402 to be connected with one another are thus arranged on top of one another and are held against one another through impact of external forces, like for example gravity G and a support force $F_G$. Their faces 401' and 402' that are oriented towards one another contact one another. In practical applications, the first component 401 can be formed for example by a bridge and the second component 402 can be formed by a bridge bearing.

The second component 402 is provided at its top side with a circular recess 420 which is provided with an annular spherical segment shaped cambered concave surface 422 in a portion of its outlet edge oriented towards the first component 401, wherein the outlet edge forms the second form-locking element 421'. At the base of the recess 420, a dead hole section 421 is provided. The diameter of the dead hole section 421 is greater than the radially inner edge 422' of the circular segment shaped cambered concave surface 422, so that the dead hole section 421 like in embodiment of FIG. 2 through 4 forms an undercut of the radially inner edge 422', forming an unloading groove.

The first portion 401 is provided with a pass-through borehole 410. In case of the ideal alignment of the two components 401 and 402 relative to one another, the axis $Y_1$ of the pass-through borehole 410 and the axis $Y_2$ of the circular recess 420 coincide as evident from FIG. 11.

An annular compensation element 402 is inserted into the recess 420, wherein the compensation element 404 is configured on an outside like the compensation element 4 illustrated in FIG. 7 and is configured analogous thereto with a radially outer convex cambered annular surface 442 and a radially inner convex cambered annular surface 440. The compensation element engages the recess 420. Thus, the larger diameter convex cambered annular surface 442 of the compensation element 404 contacts the spherical segment shaped cambered concave surface 422 in the portion of the outlet 420 in the second component 402.

A cylindrical insert 430 is inserted with a precise fit into the pass-through borehole 410, wherein the insert is received substantially without clearance in radial direction, but movable in axial direction in a direction of the borehole axis $Y_1$ in the pass-through borehole 410. The pass-through borehole 410 is provided with an inner thread section 411 in its end portion oriented away from the second component 402, wherein a clamping screw 412 is threaded into the inner thread section. The clamping screw 412 facilitates clamping the insert 430 against the compensation element 404.

The insert 430 includes an annular axial shoulder 431 at its bottom side oriented towards the second component 402, wherein the shoulder forms the first form-locking element 430' and which is provided with a circular segment shaped cambered convex surface 432 at its section oriented towards the second component 402, wherein the surface 432 engages the annular compensation element 404 and is configured to contact its concave annular surface 440. When the insert 430 is clamped against the compensation element 404 the spherical segment shaped cambered convex surface 432 of the insert 430 is applied against the radially inner concave annular surface 440 of the compensation element 404.

The function of this embodiment of the form-locking connection according to the invention is subsequently described with reference to FIG. 12.

When the two components 1 and 2 are laterally moved relative to one another the axis $Y_1$ of the pass-through borehole 410 in the first component 401 and the axis $Y_2$ of the circular recess 420 in the second component 402 are not in alignment with one another, but are laterally offset from one another as illustrated in FIG. 12. Initially the clamping screw 412 is disengaged so that the insert 430 is movable along the axis $Y_1$. When the insert 430 is moved through the clamping screw 410 against the compensation element 404, the compensation element 404 moves into a slanted position during increasing tightening of the clamping screw 412 due to the axis offset between the axes $Y_1$ and $Y_2$ until the spherical segment shaped cambered surface 440 of the compensation element 404 and the spherical segment shaped cambered surface 432 of the insert 430 contact one another. The circumferential face edges of the compensation element 404 that are oriented away from one another in axial direction thus partially penetrate the cavities formed in the borehole 410 and in the dead hole section 421. Together with the circular segment shaped cambered surfaces 422 of the second component 402 and 442 of the compensation element 404 contacting one another, a form-locking connection between the first component 401 and the second component 402 is provided, wherein the insert 430 substantially has no radial clearance in the pass-through borehole 410, wherein transversal forces $F_Q$ and $F_Q'$ are transferrable through the form-locking connection.

The invention is not limited to the embodiments described supra which are only intended to illustrate the core idea of the invention in general. The scope of the device according to the invention also extends to other embodiments in addition to the embodiments described supra. The invention can thus in particular have features which represent a combination of the respective particular features of the patent claims.

Reference numerals in the patent claims, the description and the drawings shall only help to illustrate the invention and do not limit the scope of the invention.

What is claimed is:

1. A form-locking connection for compensating position errors, comprising:
   a first component;
   a second component to be connected with the first component;
   a first circular form-locking element associated with the first component;
   a second circular form-locking element associated with the second component; and
   a compensation element provided between the first circular form-locking element and the second circular form-locking element,
   wherein the compensation element is configured as a compensation ring,
   wherein the circular form-locking elements are fixated with respect to their axial positions and form a form-locking arrangement with the compensation ring which form-locking arrangement fixates the first component and the second component in contact with and relative to each other, wherein the first circular form-locking element is provided with a first spherical segment shaped cambered surface on its side oriented towards the second circular form-locking element, wherein a center of curvature of the first spherical segment shaped cambered surface is arranged on an axis of the first circular form-locking element, wherein the second circular form-locking element is provided with a second spherical segment shaped cambered surface on its side oriented in a radial direction towards the first spherical segment shaped cambered surface of the first circular form-locking element, wherein the first spherical segment shaped cambered surface and the second spherical segment shaped cambered surface overlap along a direction of the axis in a radial projection, wherein a center of curvature of the second spherical segment shaped cambered surface is arranged on an axis of the second circular locking element, wherein the compensation ring includes a third spherical segment shaped cambered surface whose curvature is adapted to the opposite first spherical segment shaped cambered surface and a fourth spherical segment shaped cambered surface whose curvature is adapted to the opposite second spherical segment shaped cambered surface, wherein the compensation ring includes a radial inside with an inner diameter which is provided with the radially inner third spherical segment shaped cambered surface, wherein the compensation ring includes a radial outside which is provided with the radially outer fourth spherical segment shaped cambered surface, wherein the radially inner third spherical segment shaped cambered surface of the compensation ring contacts the spherical segment shaped cambered surface of the first circular form-locking element in a spherical segment, wherein the radially outer fourth spherical segment shaped cambered surface of the compensation ring contacts the spherical segment shaped cambered surface of the second circular form-locking element, wherein the radially inner third spherical segment shaped cambered surface and the radially outer fourth spherical segment shaped cambered surface of the compensation ring are surfaces that are oriented away from one another in a radial direction, wherein a curvature center of the radially inner third spherical segment shaped cambered surface and a curvature center of the radially outer fourth spherical segment shaped cambered surface are offset from one another in axial direction, wherein the curvature center of the radially inner third spherical segment shaped cambered surface is closer to the compensation ring than the curvature center of the radially outer fourth spherical segment shaped cambered surface, and wherein the compensation ring is pivotable between the form-locking elements about an axis that does not coincide with an axis of rotation symmetry of the compensation ring so that contacting spherical segment shaped cambered surfaces of the form-locking elements and the compensation ring remain in contact with one another.

2. The form-locking connection according to claim 1, wherein the first spherical segment shaped cambered surface and the fourth spherical segment shaped cambered surface are cambered convex, and wherein the second spherical segment shaped cambered surface and the third spherical segment shaped cambered surface are cambered concave.

3. The form-locking connection according to claim 1,
wherein the first circular form-locking element is provided at a bolt device,
wherein the bolt device is connected with the first component and fixated with
respect to its axial position and extends through a borehole of the second component,
wherein the second circular form-locking element is provided at the borehole of the second component,
wherein the second component is clamped between the bolt device and the first component,
wherein the bolt device includes at least one radial section at its end oriented away from the first component on its side oriented towards the second component along its circumference,
wherein the at least one radial section is provided with the first spherical segment shaped cambered surface whose curvature center is arranged on the axis of the bolt device,
wherein the second component along the circumference of the borehole on a side oriented towards the radial section of the bolt device is provided with the second spherical segment shaped cambered surface whose curvature center is arranged on an axis of the borehole, and
wherein the compensation ring is provided between the second component and the radial section of the bolt device.

4. The form-locking connection according to claim 3, wherein the bolt device is formed by a screw, wherein the screw is threaded into a threaded borehole of the first component, and wherein the radial section is configured at a screw head of the screw.

5. The screw for the form-locking connection according to claim 4, wherein a screw head is provided with a circular segment shaped convex cambered surface at its side oriented towards a thread section of the screw, and wherein a curvature center of the convex cambered surface is arranged on an axis of the screw.

6. A form-locking connection for compensating position errors, comprising:
a first component:
a second component to be connected with the first component;
a first circular form-locking element associated with the first component;
a second circular form-locking element associated with the second component, and
a compensation element provided between the first circular form-locking element and the second circular form-locking element,
wherein the compensation element is configured as a compensation ring,
wherein the circular form-locking elements are fixated with respect to their axial positions and form a form-locking arrangement with the compensation ring which form-locking arrangement positions the first component and the second component relative to one another,
wherein the first circular form-locking element is provided with a first spherical segment shaped cambered surface on its side oriented towards the second circular form-locking element, wherein a center of curvature of the first spherical segment shaped cambered surface is arranged on an axis of the first circular form-locking element wherein the second circular form-locking element is provided with a second spherical segment shaped cambered surface on its side oriented towards the first circular form-locking element, wherein a center of curvature of the second spherical segment shaped cambered surface is arranged on an axis of the second circular locking element, wherein the compensation ring includes a third spherical segment shaped cambered surface whose curvature is adapted to the opposite first spherical segment shaped cambered surface and a fourth spherical segment shaped cambered surface whose curvature is adapted to the opposite second spherical segment shaped cambered surface, wherein the compensation ring includes a radial inside with an inner diameter which is provided with the radially inner third spherical segment shaped cambered surface, wherein the compensation ring includes a radial outside which is provided with the radially outer fourth spherical segment shaped cambered surface, wherein the radially inner third spherical segment shaped cambered surface of the compensation ring contacts the spherical segment shaped cambered surface of the first circular form-locking element in a spherical segment, wherein the radially outer fourth spherical segment shaped cambered surface of the compensation ring contacts the spherical segment shaped cambered surface of the second circular form-locking element, wherein the radially inner third spherical segment shaped cambered surface and the radially outer fourth spherical segment shaped cambered surface of the compensation ring are surfaces that are oriented away from one another in a radial direction, wherein a curvature center of the radially inner third spherical segment shaped cambered surface and a curvature center of the radially outer fourth spherical segment shaped cambered surface are offset from one another in axial direction, wherein the curvature center of the radially inner third spherical segment shaped cambered surface is closer to the compensation ring than the curvature center of the radially outer fourth spherical segment shaped cambered surface, wherein the compensation ring is pivotable between the form-locking elements about an axis that does not coincide with an axis of rotation symmetry of the compensation ring so that contacting spherical segment shaped cambered surfaces of the form-locking elements and the compensation ring remain in contact with one another, wherein the first circular form-locking element is provided at a bolt device, wherein the bolt device is connected with the first component and fixated with respect to its axial position and extends through a borehole of the second component, wherein the second circular form-locking element is provided at the borehole of the second component, wherein the second component is clamped between the bolt device and the first component, wherein the bolt device includes at least one radial section at its end oriented away from the first component on its side oriented towards the second component along its circumference, wherein the at least one radial section is provided with the first spherical segment shaped cambered surface whose curvature center is arranged on the axis of the bolt device wherein the second component along the circumference of the borehole on a side oriented towards the radial section of the bolt device is provided with the second spherical segment shaped cambered surface whose curvature center is arranged on an axis of the borehole, wherein the compensation ring is provided between the second component and the radial section of the bolt device, wherein the bolt device is formed by a threaded bolt connected with the first component and by a nut threaded onto the threaded bolt, and wherein the at least one radial section is provided at the nut.

7. The compensation ring for the form-locking connection according to claim 1, wherein the compensation ring is respectively provided with a spherical segment shaped cambered surface whose respective curvature center is arranged on the axis of the compensation ring.

8. The compensation ring according to claim 7, wherein the third spherical segment shaped cambered surface is concave and the fourth spherical segment shaped cambered surface is convex.

9. The compensation ring for the form-locking connection according to claim 1, wherein the compensation ring is respectively provided with a spherical segment shaped cambered surface whose respective curvature center is arranged on the axis of the compensation ring.

10. A form-locking connection for compensating position errors, comprising:
a first component;
a second component to be connected with the first component;
a first circular form-locking element associated with the first component;
a second circular form-locking element associated with the second component; and
a compensation element provided between the first circular form-locking element and the second circular form-locking element,
wherein the compensation element is configured as a compensation ring,
wherein the circular form-locking elements are fixated with respect to their axial positions and form a form-locking arrangement with the compensation ring which form-locking arrangement positions the first component and the second component relative to one another,
wherein the first circular form-locking element is provided with a first spherical segment shaped cambered surface on its side oriented towards the second circular form-locking element, wherein a center of curvature of the first spherical segment shaped cambered surface is arranged on an axis of the first circular form-locking element,
wherein the second circular form-locking element is provided with a second spherical segment shaped cambered surface on its side oriented towards the first circular form-locking element wherein a center of curvature of the second spherical segment shaped cambered surface is arranged on an axis of the second circular locking element,
wherein the compensation ring includes a third spherical segment shaped cambered surface whose curvature is adapted to the opposite first spherical segment shaped cambered surface and a fourth spherical segment shaped cambered surface whose curvature is adapted to the opposite second spherical segment shaped cambered surface, wherein the compensation ring includes a radial inside with an inner diameter which is provided with the radially inner third spherical segment shaped cambered surface, wherein the compensation ring includes a radial outside which is provided with the radially outer fourth spherical segment shaped cambered surface, wherein the radially inner third spherical segment shaped cambered surface of the compensation ring contacts the spherical segment shaped cambered surface of the first circular form-locking element in a spherical segment, wherein the radially outer fourth spherical segment shaped cambered surface of the compensation ring contacts the spherical segment shaped cambered surface of the second circular form-locking element, wherein the radially inner third spherical segment shaped cambered surface and the radially outer fourth spherical segment shaped cambered surface of the compensation ring are surfaces that are oriented away from one another in a radial direction, wherein a curvature center of the radially inner third spherical segment shaped cambered surface and a curvature center of the radially outer fourth spherical segment shaped cambered surface are offset from one another in axial direction, wherein the curvature center of the radially inner third spherical segment shaped cambered surface is closer to the compensation ring than the curvature center of the radially outer fourth spherical segment shaped cambered surface, wherein the compensation ring is pivotable between the form-locking elements about an axis that does not coincide with an axis of rotation symmetry of the compensation ring so that contacting spherical segment shaped cambered surfaces of the form-locking elements and the compensation ring remain in contact with one another, wherein the first circular form-locking element is provided in an opening of the first component, and wherein the second circular form-locking element is provided in an opening of the second component.

11. A form-locking connection for compensating position errors, comprising:
a first component;
a second component to be connected with the first component;
a first circular form-locking element associated with the first component;
a second circular form-locking element associated with the second component; and
a compensation element provided between the first circular form-locking element and the second circular form-locking element,
wherein the compensation element is configured as a compensation ring,
wherein the circular form-locking elements are fixated with respect to their axial positions and form a form-locking arrangement with the compensation ring which form-locking arrangement positions the first component and the second component relative to one another,
wherein the first circular form-locking element is provided with a first spherical segment shaped cambered surface on its side oriented towards the second circular form-locking element, wherein a center of curvature of the first spherical segment shaped cambered surface is arranged on an axis of the first circular form-locking element, wherein the second circular form-locking element is provided with a second spherical segment shaped cambered surface on its side oriented towards the first circular form-locking element, wherein a center of curvature of the second spherical segment shaped cambered surface is arranged on an axis of the second circular locking element, wherein the compensation ring includes a third spherical segment shaped cambered surface whose curvature is adapted to the opposite first spherical segment shaped cambered surface and a fourth spherical segment shaped surface whose curvature is adapted to the opposite second spherical segment shaped cambered surface, wherein the compensation ring includes a radial inside with an inner diameter which is provided with the radially inner third spherical segment shaped cambered surface, wherein the compensation ring includes a radial outside which is provided with the radially outer fourth spherical segment shaped cambered surface, wherein the radially inner third spherical segment shaped cambered surface of the compensation ring contacts the spherical segment shaped cambered surface of the first circular form-locking element in a spherical segment, wherein the radially outer fourth spherical segment shaped cambered surface of the compensation ring contacts the spherical segment shaped cambered surface of the second circular form-locking element, wherein the radially inner third spherical segment shaped cambered surface and the radially outer fourth spherical segment shaped cambered surface of the compensation ring are surfaces that are oriented away from one another in a radial direction, wherein a curvature center of the radially inner third spherical segment shaped cambered surface and a curvature center of the radially outer fourth spherical segment shaped cambered surface are offset from one another in axial direction, and wherein the curvature center of the radially inner third spherical segment shaped cambered surface is closer to the compensation ring than the curvature center of the radially outer fourth spherical segment shaped cambered surface, wherein the first circular form-locking element is provided at a bolt device, wherein the bolt device is connected with the first component and fixated with respect to its axial position and extends through a borehole of the second component, wherein the second circular form-locking element is provided at the borehole of the second component, wherein the second component is clamped between the bolt device and the first component, wherein the bolt device includes at least one radial section at its end oriented away from the first component on its side oriented towards the second component along its circumference, wherein the bolt device is formed by a screw, and wherein the screw extends through a borehole of the first component and is threaded into a nut supported at the first component.

12. A nut for a form-locking connection according to claim 6, wherein the nut is provided with a spherical segment shaped convex cambered surface on at least one axial face, and wherein a curvature center of the convex cambered surface is arranged on the axis of the nut.

13. The form-locking connection according to claim 6, wherein the first component is configured as a wheel receiver and includes the threaded bolt in a central arrangement, and wherein a radial section is provided at the nut that is threadable onto the threaded bolt.

14. A form-locking connection for compensating position errors, comprising:
    a first component;
    a second component to be connected with the first component;
    a first circular form-locking element associated with the first component;
    a second circular form-locking element associated with the second component; and
    a compensation element provided between the first circular form-locking element and the second circular form-locking element,
    wherein the compensation element is configured as a compensation ring,
    wherein the circular form-locking elements are fixated with respect to their axial positions and form a form-locking arrangement with the compensation ring which form-locking arrangement positions the first component and the second component relative to one another,
    wherein the first circular form-locking element is provided with a first spherical segment shaped cambered surface on its side oriented towards the second circular form-locking element, wherein a center of curvature of the first spherical segment shaped cambered surface is arranged on an axis of the first circular form-locking element,
    wherein the second circular form-locking element is provided with a second spherical segment shaped cambered surface on its side oriented towards the first circular form-locking element, wherein a center of curvature of the second spherical segment shaped cambered surface is arranged on an axis of the second circular locking element,
    wherein the compensation ring includes a third spherical segment shaped cambered surface whose curvature is adapted to the opposite first spherical segment shaped cambered surface and a fourth spherical segment shaped cambered surface whose curvature is adapted to the opposite second spherical segment shaped cambered surface,
    wherein the compensation ring includes a radial inside with an inner diameter which is provided with the radially inner third spherical segment shaped cambered surface,
    wherein the compensation ring includes a radial outside which is provided with the radially outer fourth spherical segment shaped cambered surface,
    wherein the radially inner third spherical segment shaped cambered surface of the compensation ring contacts the spherical segment shaped cambered surface of the first circular form-locking element in a spherical segment,
    wherein the radially outer fourth spherical segment shaped cambered surface of the compensation ring contacts the spherical segment shaped cambered surface of the second circular form-locking element,
    wherein the radially inner third spherical segment shaped cambered surface and the radially outer fourth spherical segment shaped cambered surface of the compensation ring are surfaces that are oriented away from one another in a radial direction,
    wherein a curvature center of the radially inner third spherical segment shaped cambered surface and a curvature center of the radially outer fourth spherical segment shaped cambered surface are offset from one another in axial direction,
    wherein the curvature center of the radially inner third spherical segment shaped cambered surface is closer to the compensation ring than the curvature center of the radially outer fourth spherical segment shaped cambered surface,
    wherein the compensation ring is pivotable between the form-locking elements about an axis that does not coincide with an axis of rotation symmetry of the compensation ring so that contacting spherical segment shaped cambered surfaces of the form-locking elements and the compensation ring remain in contact with one another, for attaching a wheel at a wheel receiver-configured as a central locking device of the wheel, wherein the first component is formed by the wheel receiver, and wherein the second component is formed by the wheel.

15. The form-locking connection according to claim 14, wherein the wheel receiver is provided with a first annular profile, wherein the wheel is provided with a second annular profile, and wherein the first and the second annular profile engage one another and center the wheel with respect to the wheel receiver.

16. The form-locking connection according to claim 14, wherein the wheel receiver is provided with a first planar notch teething, wherein the wheel is provided with a second planar notch teething, and wherein the first and the second planar notch teething engage one another and center the wheel with respect to the wheel receiver.

17. A form-locking connection for compensating position errors, comprising:
    a first component;
    a second component to be connected with the first component;
    a first circular form-locking element associated with the first component;
    a second circular form-locking element associated with the second component; and
    a compensation element provided between the first circular form-locking element and the second circular form-locking element,
    wherein the compensation element is configured as a compensation ring,
    wherein the circular form-locking elements are fixated with respect to their axial positions and form a form-locking arrangement with the compensation ring which form-locking arrangement positions the first component and the second component relative to one another,
    wherein the first circular form-locking element is provided with a first spherical segment shaped cambered surface on its side oriented towards the second circular form-locking element wherein a center of curvature of the first spherical segment shaped cambered surface is arranged on an axis of the first circular form-locking element,
    wherein the second circular form-locking element is provided with a second spherical segment shaped cambered surface on its side oriented towards the first circular form-locking element wherein a center of curvature of the second spherical segment shaped cambered surface is arranged on an axis of the second circular locking element, wherein the compensation ring includes a third spherical segment shaped cambered surface whose curvature is adapted to the opposite first spherical segment shaped cambered surface and a fourth spherical segment shaped cambered surface whose curvature is adapted to the opposite second spherical segment shaped cambered surface, wherein the compensation ring includes a radial inside with an inner diameter which is provided with the radially inner third spherical segment shaped cambered surface, wherein the compensation ring includes a radial outside which is provided with the radially outer fourth spherical segment shaped cambered surface, wherein the radially inner third spherical segment shaped cambered surface of the compensation ring contacts the spherical segment shaped cambered surface of the first circular form-locking element in a spherical segment, wherein the radially outer fourth spherical segment shaped cambered surface of the compensation ring contacts the spherical segment shaped cambered surface of the second circular form-locking element, wherein the radially inner third spherical segment shaped cambered surface and the radially outer fourth spherical segment shaped cambered surface of the compensation ring are surfaces that are oriented away from one another in a radial direction, wherein a curvature center of the radially inner third spherical segment shaped cambered surface and a curvature center of the radially outer fourth spherical segment shaped cambered surface are offset from one another in axial direction, wherein the curvature center of the radially inner third spherical segment shaped cambered surface is closer to the compensation ring than the curvature center of the radially outer fourth spherical segment shaped cambered surface, wherein the compensation ring is pivotable between the form-locking elements about an axis that does not coincide with an axis of rotation symmetry of the compensation ring so that contacting spherical segment shaped cambered surfaces of the form-locking elements and the compensation ring remain in contact with one another, wherein the compensation ring is respectively provided with a spherical segment shaped cambered surface whose respective curvature center is arranged on the axis of the compensation ring, and wherein the first spherical segment shaped cambered surface is concave and the second spherical segment shaped cambered surface is convex.

* * * * *